United States Patent [19]

Garner, Jr.

[11] 4,128,757
[45] Dec. 5, 1978

[54] CUSTOMER INITIATED ORDERING SYSTEM

[76] Inventor: Dudley E. Garner, Jr., 971 SW. Meadowbrook, Palm Bay, Fla. 32905

[21] Appl. No.: 794,009

[22] Filed: May 5, 1977

[51] Int. Cl.² ............ G06K 15/18; G06K 7/10; G06F 7/38

[52] U.S. Cl. ............ 235/383; 235/92 R; 235/460

[58] Field of Search ......... 235/61.6 E, 61.7 B, 235/61.7 R, 61.9 R, 61.9 A, 61.11 E, 92 R, 61.12 R, 61.12 N; 340/146.3 SY; 35/48 B; 250/568, 569, 570

[56] References Cited

U.S. PATENT DOCUMENTS

| | | | |
|---|---|---|---|
| 3,221,148 | 11/1965 | Kreis | 235/61.12 R |
| 3,294,424 | 12/1966 | Mathews | 235/61.12 R |
| 3,304,416 | 2/1967 | Wolf | 235/92 R |
| 3,549,895 | 12/1970 | Sidorsky | 250/569 |
| 3,639,732 | 2/1972 | Crain | 235/61.12 N |
| 3,655,945 | 4/1972 | Bowen | 235/61.1 |
| 3,688,087 | 8/1972 | Howard | 235/61.9 R |
| 3,737,628 | 6/1973 | Azure | 235/61.6 E |
| 3,879,863 | 4/1975 | Georges | 235/61.6 E |
| 3,900,716 | 8/1975 | Kawabata | 340/146.3 Z |

Primary Examiner—Robert M. Kilgore
Attorney, Agent, or Firm—Richard D. Dixon

[57] ABSTRACT

This invention relates to an apparatus and method for registering and filling customer orders for merchandise at fast food restaurants or other retail stores. The system includes an opaque card of predetermined size which includes therein a data matrix of punch-out blanks for being removed by the customer from the card to form data apertures therein which represent the items and quantities ordered. The order card is then removably inserted into a frame such that the data matrix is in stationary registration with a matrix of photosensitive detectors, each located adjacent to a corresponding one of the punch-out blanks of the card for generating a data signal responsive to being illuminated by light passing through the data aperture from a source of light. A data processor is provided for sequentially receiving the data signals and responsive thereto generating order signals representative of the items and quantities ordered. Selected ones of the order signals are displayed on visual displays adjacent to the food preparation area in which that item is prepared, whereby the items comprising the order may be collected from the various preparation areas to fill the customer's order.

13 Claims, 4 Drawing Figures

CUSTOMER INITIATED ORDERING SYSTEM

BACKGROUND OF THE INVENTION

I. Field of the Invention

This invention relates to customer initiated order processing systems for fast food restaurants and other similar retail stores. More specifically, this invention relates to systems utilizing punched opaque cards containing the input data, electronic scanning of optical detectors for assimilating the data, digital electronics for processing the data, and visual displays for communicating order commands to remotely located employees as to the number and types of products which have been ordered.

II. Description of the Prior Art

Fast food franchising is one of the fastest growing industries in the country at the present time, and it has been predicted that within ten years approximately 30–40 percent of the average family's food budget will be spent at fast food or convenience food facilities. At the present time the methods for servicing customers at fast food restaurants generally start with the waitress verbally receiving the order item by item from the customer, and then travelling to all of the food preparation areas in order to obtain the ordered items. In the alternative, the waitress may verbally repeat the order, item by item, to other employees at the food preparation areas. In still another system the waitress completes a machine readable order card which is used to total the charges for the order, but the waitress then must personally travel to all of the food preparation areas in order to collect the ordered items. While these various methods are cost effective for low volume fast food operations, it will become readily apparent that these techniques are not cost effective when volumes are drastically expanded.

The data control device disclosed by Crain et al. in U.S. Pat. No. 3,639,732 represents a recent attempt to automate or computerize the customer ordering process. The Crain data control card includes a plurality of rows and columns which form a data matrix. Data is entered into the matrix by marking on the card with a dark colored pencil in the space corresponding to the type of item and the quantity of the item to be ordered. A plurality of timing marks are provided along one longitudinal margin of the card for providing registration information to the reader which physically scans the card. While this type of card and card reader are functionally effective, the use of a dynamic card reader requires complex mechanics which can foul and jam during normal use. Therefore, from a reliability and from a building cost standpoint it is highly desirable to design a card reader which reads the card is a static mode, since both mechanical and electrical sybsystems of the card reader are simplified thereby. Also, the Crain system does not eliminate the slow process of verbally receiving the order item by item from the customer and does not display the order at the food preparation areas.

Other inventors have utilized the concept of enabling the consumer to punch an aperture into a matrix on a data card to signify a particular item or event desired. For example, Cidade in U.S. Pat. No. 3,982,102 discloses a method and aparatus for punching data cards for use in a public lottery. Mathews in U.S. Pat. No. 3,294,424 uses the card punching technique for casting ballots and the like. Other inventions utilizing the concept of punched apertures in data control cards are disclosed by Shaw in U.S. Pat. No. 3,985,264, Lieberthal in U.S. Pat. No. 3,684,863, Timares et al. in U.S. Pat. No. 3,365,714, Street in U.S. Pat. No. 3,350,545, and Knutsen in U.S. Pat. No. 2,735,617. While these references are deemed relevant, experience has demonstrated that the systems disclosed by these inventors are not suitable for use by a large number of customers, each desiring to place an order for fast food service.

The problems inherent in the design of stationary card readers are well known in the art. Kawabata et al. in U.S. Pat. No. 3,900,716 disclose an optical static card reader comprising a light sensing matrix for detecting the passage of light through apertures within punched cards. As with other inventors, Kawabata finds it necessary to utilize sophisticated electronic circuitry to compensate for various fluctuating factors such as lighting voltage, deterioration of the light source, variations in the sensitivity of the optical sensors, ambient temperature, and improperly punched apertures. In order to solve these problems, Kawabata discloses the use of a light sensor which is continuously illuminated regardless of the data contained in the data matrix, and then adjusts the light received by the data photo-detectors to compensate for any reduction in illumination intensity perceived by the reference sensor. While this system is effective, it nevertheless requires additional circuitry which increases the cost and complexity of the overall system design.

Bowen et al. in U.S. Pat. No. 3,655,945 disclosed the use of photofet devices for reading pencil data marks on a paper card and punching data apertures in the same card to make it compatible with other punched paper card readers. Like other inventors, Bowen utilizes an automatic correction or compensation circuit to correct for circuit drift in the photofet and other circuit elements. Other card readers are disclosed by Azure in U.S. Pat. Nos. 3,284,929, Affel et al. in 3,505,646 and Greenaway et al. in 3,643,216.

From this review of the prior art it may be observed that the following disadvantages are characteristic of the inventions previously discussed. First, the customer does not finalize the order until arriving at, and sometimes deliberating at, the order input station, thus wasting valuable time. Second, the order must be verbally transferred item by item, to the waitress at the order input station. Third, the waitress must either personally retrieve the ordered items or repeat the order item by item to attendants at the food preparation areas.

SUMMARY OF THE INVENTION

The present invention relates to a customer initiated system for ordering selected quantities of a plurality of selected items. An opaque card of predetermined size includes therein a data matrix of punch-out blanks for being removed by the customer from the card to form data apertures therein representative of the items and quantities ordered. The data matrix is oriented in known registration with a reference edge of the card. A frame is provided for removably receiving the card so as to be in stationary registration therewith. A source of light is coupled to the frame for illuminating the data apertures in the card. A matrix of photosensitive detectors is coupled to and in known registration with the frame, with each of the photosensitive detectors being located adjacent to a corresponding one of the punch-out blanks of the card for generating a data signal responsive to being illuminated by the light passing through the data aperture from the source of light. Computer means are electrically coupled to each of the photosensitive detectors for sequentially receiving the data signals therefrom and responsive thereto generating order signals representative of the items and quantities ordered. A plurality of visual displays are electrically coupled to, but remotely spaced from, the computer means for visually displacing a selected one of the order signals, whereby individual items comprising the order may be sequentially assembled and collected from the remote locations to fill the customers order.

BRIEF DESCRIPTION OF THE DRAWINGS

Other objects, features, and advantages of the present invention will be clear from a study of the written description and the drawings in which.

DETAILED DESCRIPTION OF THE PREFERRED EMBODIMENT

Figure 1:
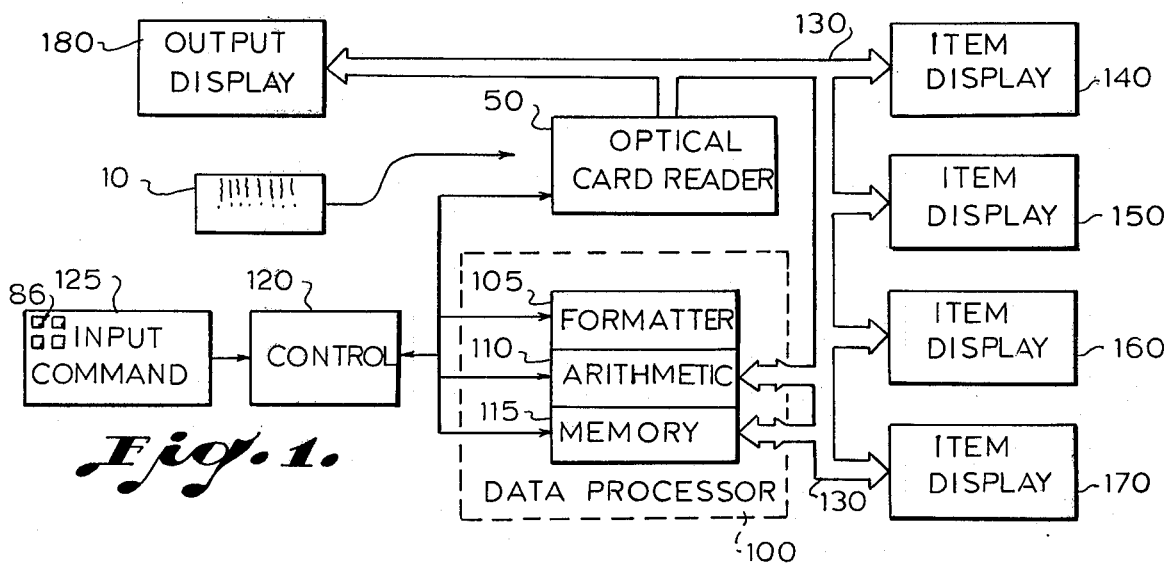
FIG. 1 illustrates a block diagram representation of the customer initiated ordering system.

A block diagram representation of a first preferred embodiment of the customer initiated ordering system in accordance with the present invention is illustrated by the diagram shown in FIG. 1. The system includes an order card 10 which is inserted into an optical card reader 50 for detecting apertures within the card which have been punched out by the customer to signify those items which the customer wishes to order. The signals developed by the optical card reader 50 are fed to a data processor or computer, shown generally as 100 in FIG. 1, which comprises the data formatter 105, an arithmetic unit 110 and a memory unit 115. These three sections of the data processor 100 together with the optical card reader 50 and item displays 140, 150, 160, and 170 are controlled by a control unit 120 having coupled thereto an input command unit 125 for allowing the operator to instruct the data processor 100 to perform certain non-ordering functions. The output of the optical card reader 50 is coupled via a data bus 130 to a plurality of item displays 140, 150, 160, and 170 which are remotely spaced from the data processor 100 and the optical card reader 50. The data bus 130 is also coupled to an output display 180 which is generally co-located with the data processor 100 and the optical card reader 50.

Figure 2:
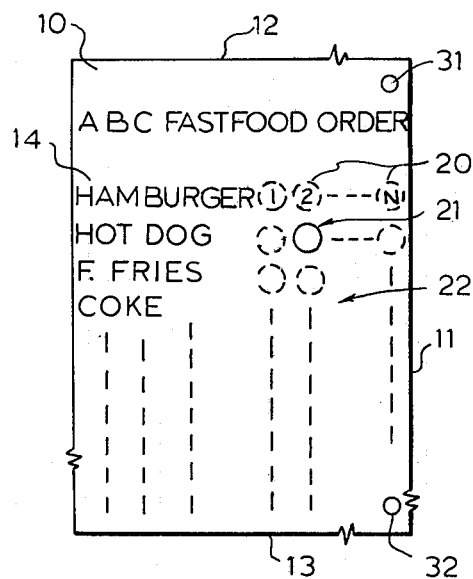
FIG. 2 illustrates a frontal view of the upper side of a typical opaque order card.

With reference to FIG. 2, the customer order card 10 comprises an IBM or Hollerith type card or other similar card formed of an opaque material which effectively blocks the passage of light from one planar side of the card to the other. The order card is typically four to eight inches wide and six to twelve inches long. The card includes along a left-hand margin thereof a column of item identifiers 14 representative of the items which may be ordered at the retail establishment. Immediately adjacent to each of the item identifies 14 is located a row of pre-perforated, punch-out blanks, shown typically as 20, with each of the blanks having printed thereon or adjacent thereto additional information relating to the item 14. Depending upon the mode of operation of the retail establishment, this additional information may be the number of the items to be ordered, or in the alternative it may represent variations in the item to be ordered. Taking for example a fast food hamburger restaurant, the additional information may represent the number of hamburgers or items to be ordered, or in the alternative it may represent the condiments which the customer wishes to have placed upon the hamburger (such as ketchup, mustard, pickle, tomatoe, lettuce, etc.). In this manner the customer is allowed to select the quantity and/or the condiments on the item which he is ordering.

The punch-out blanks 20 are arranged in a matrix 22 having generally perpendicularly arranged rows and columns therein. Typically, the matrix 22 includes approximately 50 to 500 punch-out blanks 20 separated from each other by 0.25 inches in both the lateral and transverse directions. When one of the punch-out blanks 20 is removed from the card 10, a data aperture, shown generally as 21 in FIG. 2, is thereby defined in the card. This data aperture 21 is typically 0.18 inches in diameter and its position within the matrix is known to an accuracy of approximately plus or minus 0.025 inches.

It is important that each of the data apertures 21 in the data matrix 22 be located at a known position on the data card 10. Generally, this registration is achieved by locating the data matrix 22 at a known distance from a first reference edge 11 and/or from a second reference edge 12 on the order card 10. The two reference edges 11 and 12 may be used to abut or communicate with similar reference edges on the frame of the optical card reader 50 which will be discussed subsequently. A third reference edge 13 on the card 10 may also be used if required.

The order card 10 also includes therein a first alignment aperture 31 and a second alignment aperture 32, each located in precise registration with the first reference edge 11, the second reference edge 12, and each of the data apertures 21 within the data matrix 22. The alignment apertures 31 and 32 are used in conjunction with the reference edges 11 and 12 to assure the proper alignment of the order card 10 within the card reader 50. Typically, the alignment apertures 31 and 32 have a diameter of 0.13 inches, a dimension which is slightly smaller than the diameter of the data aperture 21. In this manner if the alignment apertures 31 and 32 are in proper alignment, it will be assured that the data apertures 21, which are slightly larger in diameter, will also be in proper alignment with their respective sensors.

While the first preferred embodiment of the present order card 10 illustrates circular perforated punch-out blanks 20 which provide generally circular data apertures 21, it is deemed within the scope of this invention to utilize the data apertures and punch-out blanks of any convenient shape. The punch-out blanks 20 must be easily removed from the order form by a stylus or pencil type instrument so as to leave a relatively clean and uniform data aperture 21 in the order card 10. However, the punch-out blanks 20 must be sufficiently retained by the card 10 so that they will not be removed accidently therefrom as a result of normal handling by the customer or the employees.

The area of the order card 10 in the field of the data matrix 22 and the area of the alignment apertures 31 and 32 must be essentially opaque to prevent the transmission of light from one planer surface of the card to the other. This may be accomplished by producing the order card 10 of a dense material which will block the transmission of light, or in the alternative the card may be constructed of a relatively translucent material with an opaque material, such as aluminum foil or ink, being laminated or printed on to the area of the order card 10 adjacent to the data matrix 22 and the alignment apertures 31 and 32. It is also envisioned that adhesive patches may be provided to the customer for covering the data apertures 21 which have been inadvertently or incorrectly designated by punching out the corresponding punch-out blanks 20 therein.

Figure 3:
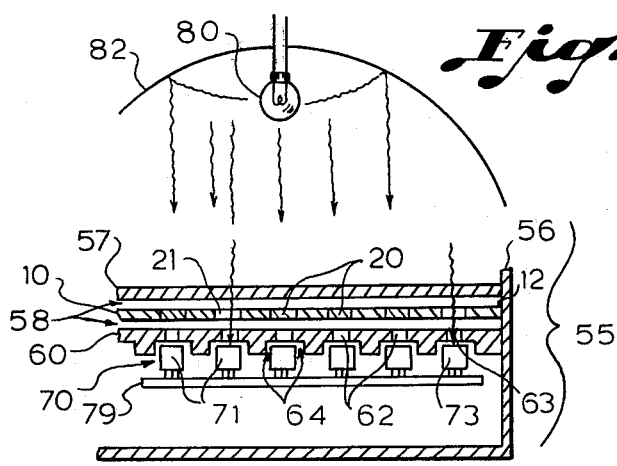
FIG. 3 illustrates a cross-section view of a typical card reader having an order card inserted thereinto for sensing the apertures therein.

A first preferred embodiment of the optical card reader 50 is illustrated by the cross-sectional view of FIG. 3 which is taken along the plane intersecting a column of punch-out blanks 20 and data apertures 21 within the order card 10. The optical card reader 50 includes a frame 55 defined by an upper transparent plate 57 coupled by a frame separator 56 so as to be juxtaposed with a mask plate 60 for defining therebetween a slot 58. The shape of the slot 58 is designed to removably receive the order card 10 therewithin such that the second reference edge 12 thereof communicates with a co-planer edge of a separator 56, and such that the first reference edge 11 thereof communicates with a paired reference surface of the separator 56. This communication between the reference edges 11 and 12 of the order card 10 and the planar surfaces of the frame separator 56 provides the proper registration between the frame 55 and the order card 10. The accuracy of this registration is confirmed by the operation of the alignment apertures 31 and 32 which will be discussed subsequently.

Assuming that the order card 10 is properly coupled within the slot 58 of the frame 55 so as to be in accurate registration therewith, each of the punch-out blanks 20 and data apertures 21 of the order card 10 will be juxtaposed with corresponding transparent sections forming a matrix within the masked plate 60, with the matrix being generally congruent with the matrix of punch-out blanks 20 in the order card 10. However, the effective apertures of the transparent sections 62 of the mask plate 60 are smaller than the effective apertures of the data apertures 21 so as to effectively control the amount of illumination passing therethrough. The mask plate 60 also includes therein additional transparent sections 63 which are designed to be in registration with and juxtaposed with the corresponding alignment apertures 31 and 32 of the order card 10.

The sensor matrix 70 includes a plurality of photosensitive transistors 71, each electrically and physically coupled to a printed circuit card 79 which is attached to the frame 55 of the optical card reader 50. The printed circuit card 79 is manufactured such that each one of the photosensitive transistors 71 is in proper registration with a corresponding one of the transparent sections 62 of the mask plate 60, which in turn is in proper registration with a corresponding one of the data apertures 21 or punch-out blanks 20 in the order card 10. The sensor matrix 70 is essentially congruent with the matrix defined by the mask plate 60 and the data matrix 22 of the order card 10. Each of the photosensitive transistors 71 is elevated to communicate within a recessed cavity 64 in the underneath side of the mask plate 60. In this manner the top or effective surface of the photosensitive transistor 71 will be shielded from ambient light from below. Also, the effective area of the phototransistor 71 will be shielded from cross-coupling light from adjacent and unwanted apertures due to the thickness of the mask plate 60. The additional photosensitive transistors 73 are mounted within recessed cavities in the mask plate 60 so as to be adjacent to the transparent sections 63 in the mask plate 60 adjacent to the alignment apertures 31 and 32 in the order card 10.

The optical card reader 50 further includes a light source 80, which may be either incandescent or fluorescent in structure, which is coupled within a reflector 82 which in turn is coupled to the frame 55. The position of the light source 80 and the design of the reflector 82 are optimized to provide illumination of essentially uniform intensity across the upper transparent plate 57, thereby providing illumination of uniform intensity upon the upper surface of the order card 10. During the reading process the order card 10 will be held in stationary registration with the sensor matrix 70 by the sandwiching effect of the upper transparent plate 57 and the mask plate 60 such that illumination passing through the data apertures 21 will be incident upon the upper surface of the photosensitive detectors 71. Since the order card 10 is composed of an opaque material, the light will be blocked out by the punch-out blanks 20 which remain in the card.

An interlock photosensitive transistor (not illustrated in FIG. 3 for clarity) is positioned adjacent to an always opaque section of the order card 10. In this manner the interlock photosensitive transistor will be constantly illuminated by the light source 80 when the order card 10 is not inserted within the slot 58. However, when the order card 10 is inserted into the slot 58 an opaque section thereof will block passage of the illumination to the interlock photosensitive detector, thereby indicating the presence of the order card 10 which will enable the control unit 120.

Figure 4:
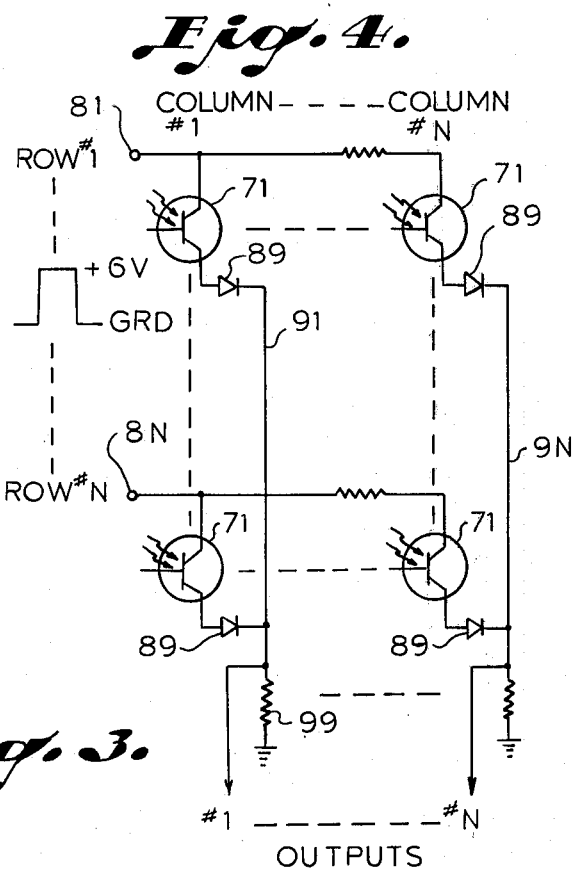
FIG. 4 illustrates a partial electrical schematic diagram representing the matrix of photosensitive detectors and the scanning signals applied thereto.

The photosensitive transistors 71 comprising the sensor matrix 70 are electrically coupled in accordance with the schematic illustration shown in FIG. 4. The collector elements of each of the photosensitive transistors 71 in a specific row are connected to a main bus corresponding to that row 81, 82, etc. The emitter elements of the photosensitive transistors 71 are coupled through a blocking diode 89 to an output bus for that particular column of sensors 91, 92, etc. The output bus 91 is terminated in an output resistor 99 for developing an output voltage thereacross as the series current passes therethrough. When the amount of light illuminating the base element of the photosensitive transistor exceeds a predetermined level, the transistor becomes saturated causing the typical collector-emitter voltage to drop to less than 0.5 volts. On the other hand, when no light is incident upon the base element, the collector to emitter path is essentially blocked with only the leakage current of less than 1 microamp passing therethrough.

A CMOS logic chip is utilized to sequentially pulse each of the rows of photosensitive transistors 71 with typically a 6 volt positive signal. If one or more of the photosensitive transistors 71 in that row (e.g. 81) is saturated by the presence of illumination of sufficient intensity upon the base element thereof, then an output voltage of approximately 5 volts will appear across the output resistor thereof (e.g. 99). On the other hand, if none of the photo transistors in that row are saturated, the output voltage will be essentially 0. The control circuitry 120 illustrated in FIG. 1 sequentially steps the input pulses down the rows to sample each of the photosensitive transistors in the data matrix 22. The series diodes 89 prevent the loading of the output bus from rows which are not being energized by the CMOS logic chip by minimizing the reverse currents therethrough. Since the output currents through the photosensitive transistors 71 are typically in the order of 100 microamps, standard CMOS integrated circuits such as the 4017 may be typically used for the row logic driver circuitry. CMOS integrated circuits such as the 4019 are utilized for sensing the parallel output buses since the 0-5 volt output signals are directly compatible with CMOS type logic.

This type of sensor matrix 70 is superior to prior art circuits in that the illumination is either totally blocked or totally available to the detection device. Therefore, the light source is designed to cover the effective variations due to aging, voltage fluctuation, temperature fluctuation, and production variations in the sensitivity of the photo transistors. No reference levels, compensation or thresholding circuits are required with this design approach, thereby reducing construction costs and maintenance problems.

With reference to FIG. 1, the control unit 120 receives signals from the interlock photosensitive transistor and the alignment photosensitive transistors 73 for determining if the order card 10 is in proper registration and alignment with the sensor matrix 70. When an "enter" command from the operator waitress is applied, the control unit 120 initiates a sequential strobbing of each of the input buses 81, 82, etc. to transfer the data from the order card 10 into the data processor 100 and the item displays 140, 150, 160, and 170. At any time during this reading operation if the order card 10 is jarred or moved out of proper registration, then the control unit 120 will stop the reading process and signal the operator to reposition the order card.

The formatter 105 correlates the sequential data from the optical card reader 50 with the stored information in the formatter 105 that first determines if a particular row on the customer order card 10 is divided into sub-items and then establishes a price for each item or sub-item. This information is contained in the formatter 105 in the form of a digital data word for each item or sub-item, with typically one bit controlling the format (item or sub-item) and 7 to 11 bits establishing the price. This data information may be stored in the formatter 105 by the use of fusible links, or erasable PROMS or other more readily changeable devices such as thumbwheel switches, keyboard entries, paper tape readers, etc. In the first preferred embodiment of the present invention, removable PROMs are utilized to store the pricing and formatting information for each of the items available.

Once the information is correlated by the formatter 105, the binary data representing quantities of each ordered item is multiplied by the arithmetic unit 110 times the price for that item, with the resultant sub-total being accumulated in a separate storage register. After the prices for all ordered items have been accumulated, the arithmetic unit 110 calculates the tax by comparing the accumulated sub-total to a reference table and then adds the sales tax to the sub-total for providing a final total. The arithmetic unit 110, in cooperation with the memory unit 115, also accumulates a running total of the number of each of the items which have been ordered and the running total of the sales figures since the memory was initialized. These accumulated totals and sub-totals may be displayed on the output display 180 by signaling the memory unit 115 through the proper input command switch 125.

The memory switch 115 is a solid state random access memory (RAM) with sufficient storage for all transactions expected for a day or other unit of operation. One segment of the RAM is allocated for temporary storage of the order being processed so that the order can be voided should the customer desire to change the order before the transaction is completed. An additional section of the RAM is allocated for accumulating the running totals of the items ordered and the ordered prices. While the present invention has been described as being composed of discrete functional modules, it will be obvious to one skilled in the art that a properly programmed micro-processor or minicomputer may be utilized to perform all of the aforementioned functions of the data processor 100.

The data bus output 130 from the card reader 50 is utilized to communicate the order signals to the corresponding one of the item displays. Each of the item displays is generally separated from the main data processor 100 so as to be close to the area responsible for the preparation of the ordered item. For example, one of the item displays 140 may be located adjacent to the employee responsible for preparing hamburgers, while the second item display 150 may be located adjacent to the employee responsible for the preparation of french fries, etc. In this manner each employee receives an order command only for those items for which he is responsible, i.e. hamburgers, etc. The item displays may be single unit displays, or they may accumulate the orders in a sequential manner so that the employee may visually scan the sequence of orders as they have been accepted by the optical card reader. If the sequential order display system is utilized, a dump switch may also be provided to allow the employee to clear the initial item from the item display after a particular order has been filled.

The output display 180 is also coupled to the data bus 130 for displaying to the customer the total price for the items ordered and if desired the itemized display of the quantity of each of the items ordered.

The customer initiated ordering system may also include other features which will assure a pratical and efficient operation of the system. One such feature is an error detection sub-system incorporated into the data processor 100 for assuring that the customer order card 10 is properly programmed. That is, in some applications only one quantity selection per ordered item or sub-item is permissible, and an error signal must be displayed to the operator if the order card 10 is importantly programmed. A separate card reader sub-system, data processor and price display system may also be provided to assist the customer in finalizing his order and obtaining proper coins and bills in advance of actually placing the order with the waitress. In a more advanced system, a food delivery sub-system could be coupled to the data bus 130 for receiving the command signals therefrom and responsive thereto depositing the ordered items on a conveyer belt or similar transport system which runs from the food preparation area to the order pick up area. Also, an automatic cash dispenser and/or change dispenser may be coupled to and controlled by the data processor 100.

The operation of the customer initiated ordering system will now be described with reference to FIG. 1. The customer first selects a blank order card 10 and then presses a blunt instrument or scribe against the punch-out blanks 20 corresponding to the quantity and description of the item to be ordered. After all of the items have been selected by the customer, the order card 10 is then placed in the optical card reader 50. A signal from the interlock photosensitive transistor signals the control unit 120 that the card has been inserted. Upon receiving signals from both of the alignment photosensitive transistors 73 indicating that the order card 10 is in proper registration with the sensor matrix 70, the control unit 120 either automatically or upon receipt of input command 125 from the operator initiates a sequence of scanning each row of sensors within the sensor matrix 70. Each of the photosensitive transistors 71 in the sensor matrix 70 emits a data signal responsive to either the absence or presence of light incident thereupon. If the punch-out blanks 20 in a particular column have not been removed, then the photosensitive transistor 71 will remain cut-off and a binary zero signal will be supplied to the output data bus for that column. However, if that particular punch-out blank 20 has been removed, the light from the light source 80 will travel through the upper transparent plate 57, through the data aperture 21 in the order card 10, through the transparent section 62 of the mask plate 60 for illuminating the base element of the photosensitive transistor 71. Responsive to this illumination the photosensitive transistor 71 will be saturated causing current to flow through the output bus for that particular column, thereby creating a voltage across the output resistor for that column indicative of a binary one signal. These binary signals are correlated by the formatter 105 for association with the proper ordered item and the corresponding price. The data signals are then translated into order commands which are transmitted through the data bus 130 to the appropriate item display for that particular ordered item. Also, the order commands are received by the arithmetic unit 110 for calculating the total price of the ordered items, the sales tax for the sub-total and the final total for the entire order. The arithmetic unit 110 and the memory unit 115 also accumulates a running total of each of the ordered items and a running total of the dollar value of these orders. As the order signals are displayed on each of the item displays 140, 150, 160, 170 adjacent the appropriate preparation area, the responsible employee fills that portion of the order and delivers that item to a central food distribution area where the customer may pick up his completed order. Simultaneously with this display, the customer may view the total amount and a break down of his order on the output display 180. At the end of an operating cycle the manager of the business may actuate the proper input command signals 125 for effecting a display of the accumulated quantities of each item ordered and the accumulated dollar totals corresponding thereto for accounting and inventory control purposes. The memory system may be reset or cleared by an input command from the manager.

In this manner the customer may designate on the order card 10 the quantities of each of the items which he wishes to order. After the selection process is completed by the customer, the remainder of the order processing is efficiently and quickly processed by the data processing system 100 to display on the appropriate item display 140, 150, 160, 170 in the corresponding food preparation areas the quantities of each of the items ordered from that food preparation area. Simultaneously, the customer is advised of the total charge for the order.

While for the purposes of description I have shown and described a first preferred embodiment of my invention, it will be apparent that changes and modifications can be made therein without departing from the spirit of my invention or the scope of the appended claims. The present invention should not be limited in its application to the details illustrated in the accompanying drawings of the specification, since it must be understood that the terminology and description employed herein are used solely for the purpose of describing the construction and general operation of the preferred embodiment of the invention.

I claim:

1. A customer initiated system for ordering selected quantities of a plurality of customer selected items, said system comprising in combination:

an opaque card of predetermined size including therein a two dimensional data matrix of punch-out blanks for being removed by the customer from the card to form data apertures therein representative of the items and quantities to be ordered, with said data matrix oriented in known registration with a reference edge of said card;

a frame for removably receiving said card so as to be in stationary registration with said reference edge of said card;

a source of light coupled to said frame for illuminating said data apertures of said card;

a two dimensional matrix of photosensitive detectors coupled to and in known stationary registration with said frame and said card, with each of said photosensitive detectors being located adjacent to a corresponding one of said punch-out blanks of said card for generating a data signal responsive to being illuminated by light passing through said data aperture from said source of light;

computer means electrically coupled to each of said photosensitive detectors for sequentially scanning said matrix and receiving said data signals therefrom and responsive thereto generating order signals representative of the items and quantities ordered; and a plurality of visual displays electrically coupled to, but each remotely spaced from, said computer means for visually displaying selected ones of said order signals, whereby individual items comprising the order may be separately assembled and collected from the remote preparation locations to fill the customer's order.

2. The customer initiated ordering system as described in claim 1 further including alignment means comprising in combination:

pre-punched alignment apertures, located outside of the area defined by said two dimensional data matrix, communicating through said card at locations in known registration with said matrix of photosensitive detectors and with said reference edge of said card;

another source of light for illuminating said alignment apertures;

alignment photosensitive detectors each coupled to and in known registration with said frame for receiving light through a corresponding one of said alignment apertures from said another source of light only when said data matrix is in proper registration with said matrix of photosensitive detectors, with each of said alignment photosensitive detectors generating a first alignment signal responsive to being illuminated by said another source of light; and wherein said computer means include interlock means electrically coupled to each of said alignment photosensitive detectors for receiving said first alignment signals therefrom and responsive thereto enabling said computer to accept said data signals.

3. The customer initiated ordering system as described in claim 2 wherein said interlock means further includes:

an interlock photosensitive detector for generating a second alignment signal responsive to said card being inserted into said frame so as to block the passage of light from said source of light to said interlock photosensitive detector, with said interlock photosensitive detector being electrically coupled to said computer means for enabling said computer to accept said data signals only responsive to receiving both of said first alignment signal and said second alignment signal.

4. The customer initiated ordering system as described in claim 2 wherein said card is juxtaposed between said source of light and said matrix of photosensitive detectors when said card is received in proper registration within said frame.

5. The customer initiated ordering system as described in claim 4 wherein said frame further includes a mask interposed between said card and said matrix of photosensitive detectors, with said mask including therein a matrix of transparent areas spaced so as to be generally congruent with said matrix of photosensitive detectors and with said alignment photosensitive detectors for restricting the beamwidth of the light passing therethrough, thereby reducing cross-interference light passing through non-corresponding ones of said data apertures and said photosensitive detectors.

6. The customer initiated ordering system as described in claim 5 wherein said data matrix comprising sets of intersecting rows and columns, with each of said punch-out blanks being located at an intersection of one of said rows and one of said columns.

7. The customer initiated ordering system as described in claim 2, wherein each of said data apertures is of larger effective cross-sectional area than said alignment apertures.

8. The customer initiated ordering system as described in claim 2, wherein each of said photosensitive detectors comprises a phototransistor which controls the series current passing therethrough responsive to the intensity of light incident thereupon.

9. The customer initiated ordering system as described in claim 2, wherein said computer means further includes:

arithmetic means for receiving said order signals and calculating responsive thereto a total price for all of the items selected in each order; and long term memory means for accumulating said order signals representative of the total quantities for each of the ordered items and for accumulating said total prices from each order.

10. The customer initiated ordering system as described in claim 9, wherein selected ones of said visual displays further include:

short term memory means for storing selected ones of said order signals during the display thereof; and a delete signal generator for generating a delete signal which is coupled to said short term memory means for deleting a first one of said order signals being displayed by said visual display, whereby the operator of the station may manually activate said delete signal generator responsive to providing the required quantities of the ordered item.

11. A method for registering and filling customer orders for merchandise at a fast food or other retail store, said method comprising the steps of:

(a) providing the customer with an opaque order card including thereon a data matrix of punch-out blanks representative of the quantity and types of merchandise available;

(b) punching out selected ones of said punch-out blanks for defining data apertures in said order card representative of the quantity and type of merchandise ordered;

(c) juxtaposing said data matrix of said order card adjacent to and in stationary registration with a congruent matrix of photosensitive detectors, with each of said photosensitive detectors being of the type which generates a data signal when illuminated by light;

(d) verifying the proper registration between said data matrix and said matrix of photosensitive detectors by illuminating a plurality of alignment aperatures located within said order card in known registration with said data matrix, and then detecting the passage of light through said alignment apertures by a plurality of photosensitive detectors each of which evokes an alignment signal responsive to the illumination;

(e) illuminating said data apertures within said order card;

(f) detecting, subsequent to receiving all of said alignment signals, the light passing through said data apertures by electrically interrogating in sequence each of said photosensitive detectors and storing the data signals received therefrom;

(g) receiving and reformatting said data signals into order signals representative of the quantity and type of items ordered; and (h) visually displaying selected ones of said order signals adjacent remotely located food preparation areas corresponding to the items ordered, whereby the operator preparing that item will receive visual instructions as to the quantity of that item requested by the order.

12. The method as described in claim 11 wherein step (h) includes the additional steps of:

(h 1) sequentially storing selected ones of said order signals;

(h 2) displaying in sequence each of said order signals in storage; and (h 3) erasing the first one of said order signals from storage responsive to the first order being filled.

13. The method as described in claim 12 further comprising the steps of:

(i 1) pairing with each item a representation of the unit price;

(i 2) calculating the total order price by multiplying the quantity ordered by the unit price for each of the items ordered; and (i 3) accumulating in a long term memory the quantities of each of the items ordered and the total order prices.

* * * * *